Nov. 4, 1941.    G. W. BLANOT ET AL    2,261,105
RETARDER FOR CAR DUMPERS
Filed June 27, 1939    4 Sheets-Sheet 1

FIG. 1

INVENTORS
GUY W. BLANOT
BY JOHN ANDREWS
Kuis Hudson & Kent
ATTORNEYS

Nov. 4, 1941.   G. W. BLANOT ET AL   2,261,105
RETARDER FOR CAR DUMPERS
Filed June 27, 1939   4 Sheets-Sheet 3

INVENTORS
GUY W. BLANOT
JOHN ANDREWS
BY
Kwis Hudson & Kent
ATTORNEYS

Nov. 4, 1941.    G. W. BLANOT ET AL    2,261,105
RETARDER FOR CAR DUMPERS
Filed June 27, 1939    4 Sheets-Sheet 4

INVENTORS
GUY W. BLANOT
JOHN ANDREWS
BY Kwis Hudson Kent
ATTORNEYS

Patented Nov. 4, 1941

2,261,105

UNITED STATES PATENT OFFICE 2,261,105

RETARDER FOR CAR DUMPERS

Guy W. Blanot and John Andrews, Lorain, Ohio, assignors to The Toledo, Lorain & Fairport Dock Company, Cleveland, Ohio, a corporation of Ohio Application June 27, 1939, Serial No. 281,380

21 Claims. (Cl. 214—52)

This invention relates to a car dumper, and more particularly to a retarder for a car dumper.

In the usual car dumper construction a cradle on which a loaded car is clamped is turned to dump the contents of the car into a discharge pan, which ordinarily has a steep angle of inclination. Inasmuch as the cars handled by a car dumper are frequently loaded with friable material, such as coal for example, considerable breakage of the material occurs during the dumping thereof into the discharge pan and during the rapid descent of the material down the steeply inclined discharge pan. This is particularly true in car dumpers wherein the pivotal axis about which the cradle of the dumper turns is located relatively low with respect to the upper edge of the car, it being understood that in such instances there is a considerable direct fall of the material from the car into the discharge pan.

An object of the invention is to provide an improved and novel mechanism for use in connection with car dumpers for the purpose of eliminating or reducing to a minimum the breakage of material while being dumped from a car on the cradle of the car dumper into the discharge pan thereof as well as during the descent of the dumped material in the discharge pan.

Another object is to provide a mechanism for use with a car dumper and of such character that the material during the initial portion of the dumping thereof will be received by a retarder plate rather than falling directly into the discharge pan, while during the continued dumping of the material said retarder plate will control the movement of the material into the discharge pan and down the same for at least a portion of its length.

Another object is to provide a mechanism of the character above specified, which is carried substantially entirely by the discharge pan of the car dumper.

A further object of the invention is to provide in a car dumper a retarder mechanism for controlling the velocity with which material is dumped from a car into the discharge pan of a car dumper, as well as the velocity with which said material travels down the discharge pan and wherein the rate of movement of the retarder mechanism to allow the material to pass into the pan and down the same is controlled by means acting on the mechanism and tending to maintain the same in its normal position.

A still further object is to provide a retarder mechanism for a car dumper such as specified in the last named object, and wherein means is provided for controlling the rate of movement of the retarder plate in returning to its normal position after the material has been discharged from the current car that is being dumped by the turning movement of the cradle of the car dumper and has passed downwardly of the inclined discharge pan.

Another object is to provide in a retarder mechanism for a car dumper means for stopping the movement of the retarder plate in either direction and for locking said plate against movement in any position desired, which means can be controlled by the operator from any suitable position, such as the usual control cab of the dumper.

Another object is to provide a retarder mechanism for a car dumper which improves the efficiency of operation of the dumper and which is relatively simple in construction and can be applied to dumpers now in service.

Further and additional objects and advantages not hereinbefore specified will become apparent hereinafter during the detailed description which is to follow of an embodiment of the invention that is illustrated in the accompanying drawings, wherein.

The invention by way of illustration is shown and will be described herein as applied to car dumpers of the lifting type, although the invention could equally as well be applied to car dumpers of different types.

In car dumpers of the lifting type the car to be dumped is run onto the cradle when the latter is in a position lower than the dumping point, after which the cradle with the car thereon is raised to the desired dumping elevation, whereupon it is rotated until the contents of the car are discharged over the side thereof into a suitable receptacle. Following the dumping of the contents of the car the cradle is rotated in the reverse direction until the car is again in the upright position, whereupon the cradle is lowered to its original or car receiving position.

The receptacle into which the contents of the car are dumped is known as a discharge pan, and said pan is ordinarily carried by a pan girder which can be adjustably positioned vertically at various points of the dumper frame.

The usual practice followed in the construction of car dumpers of the lifting type is to employ suitable guides for the cradle which maintain the cradle in its upright position until it has been hoisted to the predetermined and desired dumping point where the dumping rotation is to take place. The usual construction employs hooks attached to the inner end of the pan or to the pan girder supporting the inner end of the pan and which hooks engage with pins attached to the cradle structure in such manner that when the pins engage the hooks the vertical hoist of the forward side of the cradle is stopped by such engagement, while the continued application of the cradle hoisting means acts only on the rear side of the cradle and causes the cradle to rotate about the pins as an axis, which rotation continues until the material in the car upon the cradle is discharged by gravity over the side of the car into the discharge pan.

Figure 1:
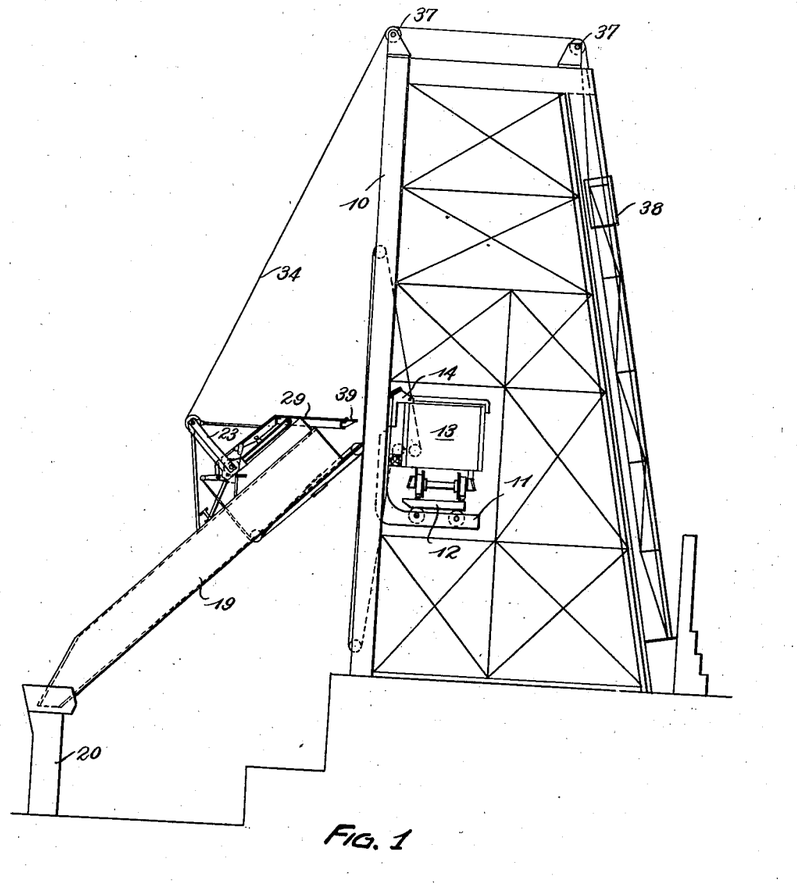
Fig. 1 is a side elevational view of a car dumper having a retarder mechanism embodying the invention applied thereto.

Referring to Fig. 1 of the accompanying drawings, the car dumper is shown as comprising a tower 10 formed of suitable structural members and having a vertically movable tiltable cradle 11 arranged therein and slidable along suitable vertical guides formed on the main frame posts of the tower as is well understood in the art.

The vertical hoist movement of the cradle is effected by means of cradle hoist ropes, not shown, and the cradle 11 is provided with a platen 12 having tracks thereon to receive a car 13, such platen preferably being shiftable laterally by suitable means to cause the car to be moved over beneath the car clamps 14 on the dumping side of the cradle as the cradle starts to turn and to restore the platen to center position at the end of the return movement of the cradle after the dumping operation.

The cradle 11 at its dumping side and adjacent each end of the cradle has the upper end of the vertical portion of the cradle frame recessed in the present instance to provide hook-like formations as indicated at 15, which engage with pins 16 carried by the adjustable girder when the cradle reaches dumping position in its vertical ascent in the dumper frame.

It will be understood that when the pins 16 have been engaged by the hooks 15 the cradle pivots about said pins as an axis to dump the contents of the car. It will be noted that in the present illustration this pivotal axis of the dumping movement of the cradle is relatively low as compared with the top edge of the car and reference will later be made to this fact.

As already stated, the pins 16 are carried by the adjustable pan girder 17 which, as is well understood in the car dumper art, can be adjusted to various positions vertically of the dumper frame to change the height of the dumping position of the cradle.

Figure 2:
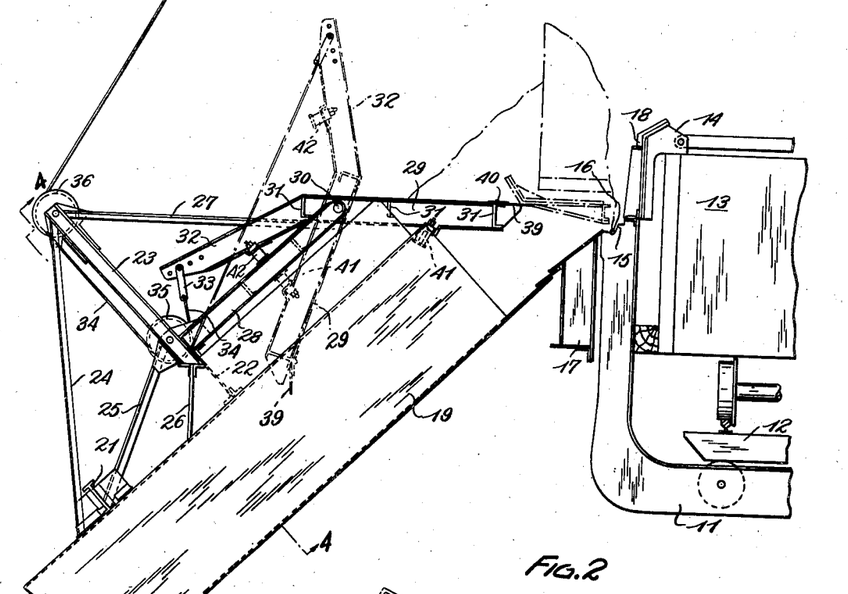
Fig. 2 is a fragmentary side elevational view of a portion of the discharge pan and cradle of the car dumper shown in Fig. 1 and is on a larger scale than Fig. 1, the normal position of the retarder plate of the retarder mechanism being indicated by full lines and the fully opened position of said plate being indicated by dash lines.

Secured to the car clamps 14 is a plate 18 that extends the full length of the cradle and has its outer end angularly disposed, as clearly indicated in Fig. 2. The purpose of the plate 18 is to bridge the space between the cradle and the retarder plate of the retarder mechanism, as will later be explained, during the dumping operation.

A discharge pan 19 is pivotally connected to the adjustable girder 17 and is of usual construction, in that it is of upwardly facing channel formation and may have its side walls inwardly and downwardly converging to enable the lower end of the discharge pan to interfit with the upper end of a discharge chute 20 that extends into the hold of a vessel or other receptacle into which the dumped material is being discharged.

As already stated, ordinarily when the cradle of a car dumper is turned to dumping position the contents of a car on the cradle are rapidly dumped or discharged from the car into the discharge pan, and if the material is of a friable character, such as coal, considerable breakage occurs resulting in a substantial loss in quantity or deterioration of the quality of the material. This is particularly the case where the pivotal axis of the dumping movement of the cradle is relatively low as compared to the upper edge of the car being dumped as in the example illustrated herein.

It is proposed in the present invention to reduce to a minimum the breakage of material being dumped from a car on the cradle into the discharge pan and to accomplish this end a retarder mechanism now to be described is employed.

A supporting structure is mounted on the discharge pan 19 and this structure is formed of suitable structural elements secured to the upper edges of the discharge pan and extending transversely the width thereof. As indicated in Figs. 2 to 4 and 7 and 8 the structure includes frame members 21 and 22 extending transversely of the discharge pan and having secured thereto vertically extending members 23 which are interbraced or reenforced by diagonal members 24, 25, 26 and 27, as clearly indicated in the drawings. It will be understood that the structural members just referred to and constituting the supporting structure for the retarder mechanism are preferably in the form of structural steel elements such as channels, I-beams and the like and may take any desired form.

The supporting structure for the retarder mechanism also includes a frame indicated generally at 28 formed of structural steel members and suitably secured to the structural members previously referred to and projecting from the vertical members 23 toward the upper end of the discharge pan in spaced relation above the retarder and parallel to its upper edge.

A retarder plate 29 is pivotally connected to the upper end of the frame 28, as indicated at 30, and extends across the discharge pan 19 at the upper end of the latter and a substantial distance above the floor of the discharge pan when said plate is in its normal position. The retarder plate 29 is constructed of a number of structural members 31 extending transversely the width of the discharge pan and interconnected top and bottom by suitable metal plates. The retarder plate 29 adjacent each of its ends is provided with an arm 32 extending angularly from the left-hand edge of the retarder plate, as viewed in Fig. 2, toward the members 23 of the supporting structure for the retarding mechanism.

The left-hand ends of the arms 32, as viewed in the drawing, are connected by means of pivoted links 33 to ropes 34 which pass around sheaves 35 and 36 rotatably carried by the supporting structure for the retarding mechanism and extend upwardly over sheaves 37 at the top of the dumper frame 10 and thence downwardly of the rear side of the dumper frame to a counterweight 38 that is slidably mounted on said rear side of the frame. The counterweight 38 is of such size that it normally maintains the retarder plate 29 in the position indicated by full lines in Figs. 2 and 3, as well as being of sufficient weight to restrain the retarder plate against rapid turning movement on its pivot 30 under the weight of the coal or other material dumped on the retarder plate from a car on the cradle 11.

A flapper plate 39 extends the length of the right-hand edge of the retarder plate 29, as viewed in Fig. 2, and is pivotally connected to the retarder plate as indicated at 40. The flapper plate 39 is normally an extension of the upper surface of the retarder plate 29, as viewed in Fig. 1, and the pivotal connection and association between the flapper plate and the retarder plate is such that said retarder plate cannot swing downwardly from the position shown in full lines in Fig. 2 but may swing upwardly from such position.

It will be noted by reference to Fig. 2 that when the cradle has swung through an arc of 90° in its dumping movement, the outer end of the plate 18 contacts with the flapper plate 39 so that during the further dumping movement of the cradle the plate 18 acting on the flapper plate, and in addition the weight of the material being dumped, serves to swing the retarder plate 29 downwardly about its pivotal axis 30 and against the action of the counterweight 38.

The purpose of the flapper plate 39 is that should lumps of coal or other material become lodged in the discharge pan between the bottom of the latter and the underside of the flapper plate 39, such lumps will not be crushed or broken as the flapper plate is free to move upwardly about its axis 40 even though the swinging movement of the retarder plate 29 about its axis 30 continues.

It sometimes happens, and especially in car dumpers wherein the pivotal axis of the cradle is relatively low with respect to the top edge of the car thereon, that lumps of the material being dumped fall from the car during the initial part of the dumping movement of the cradle and these lumps of material would either be crushed or would interfere with the effective operation and opening movement of the retarder plate 29 were it not for the flapper plate 39 being free to swing upwardly.

The counterweight 38, as already mentioned, is of such size that the retarder plate 29 will turn relatively slowly on its pivotal axis 30 under the action of the plate 18 engaging with the flapper plate 39 during the dumping movement of the cradle, and under the action of the weight of the dumped material on the retarder plate, with the result that said material is gradually and slowly allowed to pass from the car 13 into the discharge pan 19 and then gradually and slowly to flow down the discharge pan to the lower end thereof.

Inasmuch as the retarder plate in its normal and initial position is relatively close to the dumping edge of the car, the material dumped from the car will not fall initially through any great distance and thus breakage of the material will be held at a minimum. The retarder plate 29 swings downwardly under the turning action of the cradle and the weight of the material on the plate between the sides of the discharge pan 19 until in its fully opened position it will assume the dash line position of Figs. 2 and 3, at which time the buffers 41 on the underside of the retarder plate will be in engagement with the underside of the frame 28, as clearly indicated in Fig. 2.

In this connection it should be noted that the arms 32 of the retarder plate are provided on their undersides with buffers 42 which when the retarder plate 29 is in the full line normal position of Fig. 2 are in engagement with the upper side of the frame 28.

Figure 5:
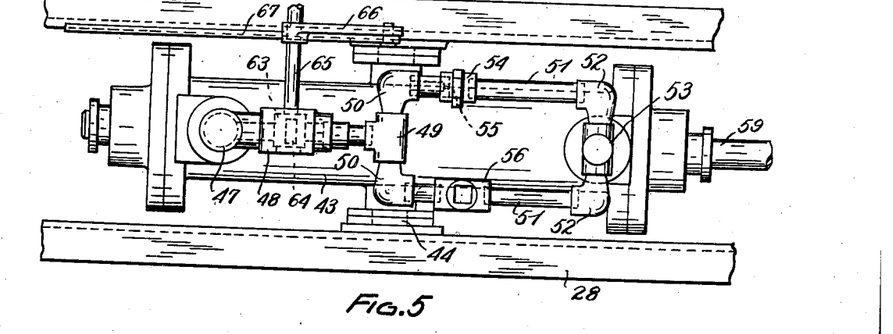
Fig. 5 is a top plan view of the hydraulic dashpot for controlling the movement of the retarder plate of the retarder mechanism from fully open position to normal position or closed position and for locking the retarder plate against movement in any desired position.

In order to control the rate of the return movement of the retarder plate from fully opened position to its normal position under the action of the counterweight after the material has passed from the retarder plate and has flowed downwardly of the discharge pan and in order to lock the retarder plate against movement in either the opening or closing directions the following mechanism is employed:

A pair of hydraulic cylinders 43 are pivotally connected intermediate their opposite ends, as indicated at 44, see Fig. 5, to the horizontal frame 28 of the supporting structure for the retarder mechanism. The hydraulic cylinders 43 are located intermediate the arms 32 and adjacent the opposite ends of the frame 28. Adjacent each end of the hydraulic cylinders 43, are, in the present instance, vertically extending bosses 45 provided with passages 46.

The left-hand boss 45 of each cylinder, as viewed in Figs. 5 and 6, has secured thereto an angle-shaped fitting 47 provided with a passage therethrough and in turn connected with a fitting 48 housing a valve, later to be referred to. The fitting 48 is connected with a T-union 49 which, in turn, is connected by elbows 50 with the pipes 51 located above the cylinder in spaced parallel relation.

Figures 4, 6:
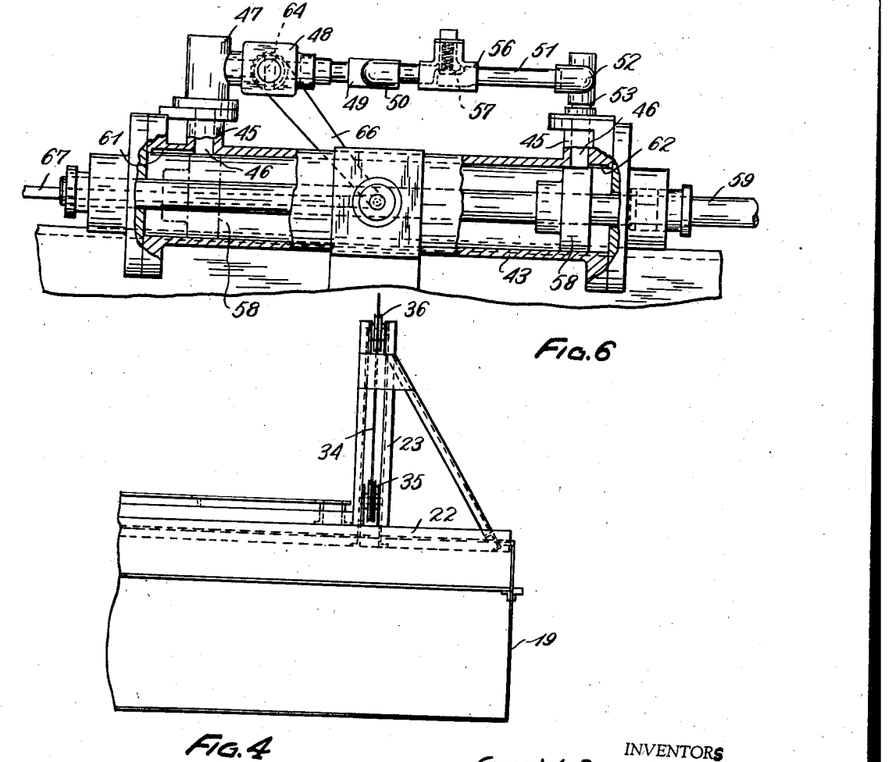
Fig. 4 is a fragmentary sectional view taken substantially on line 4—4 of Fig. 2 looking in the direction of the arrows.
Fig. 6 is a side elevational view of the hydraulic dashpot shown in Fig. 5.

The right-hand ends of the pipes 51, as viewed in the drawing, are connected by elbows 52 with a fitting 53 secured to the upper side of the right-hand boss 45 as viewed in Figs. 5 and 6. It will be seen that the opposite ends of the cylinders 43 can be placed in communication with each other through the fittings, elbows and pipes just referred to.

The upper pipe 51, as viewed in Fig. 5, is provided intermediate its ends with a coupling 54 in which is a constantly open orifice 55 permitting the passage of fluid therethrough in both directions. The lower pipe 51, as viewed in Fig. 5, is provided intermediate its ends with a coupling 56 housing a spring-pressed valve 57, see Fig. 6, which will open under the pressure of the fluid flowing from the right-hand end of the cylinders toward the left-hand end thereof, as viewed in the drawings, when the pistons, later to be referred to, move in one direction.

Figure 3:
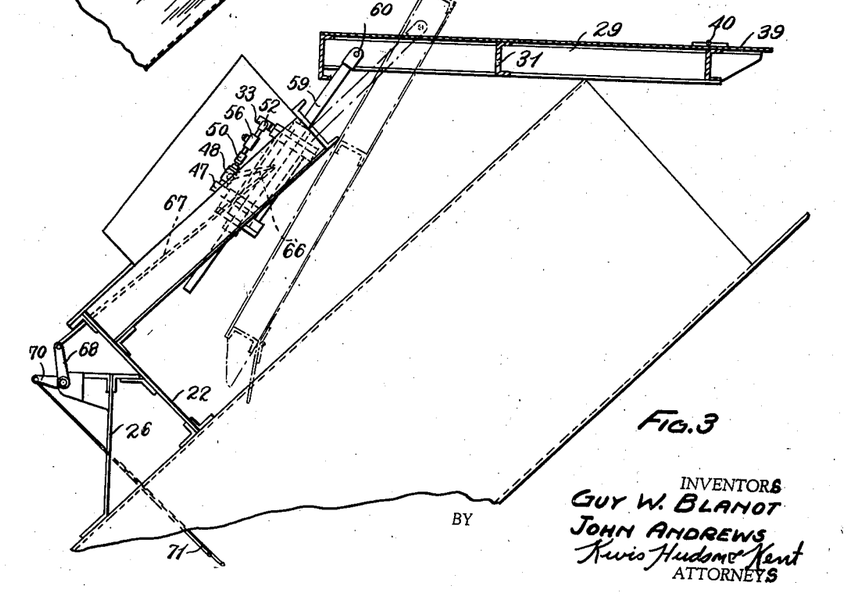
Fig. 3 is a fragmentary sectional view through the discharge pan and retarder mechanism and is taken substantially on line 3—3 of Fig. 7 looking in the direction of the arrows.
Figure 7:
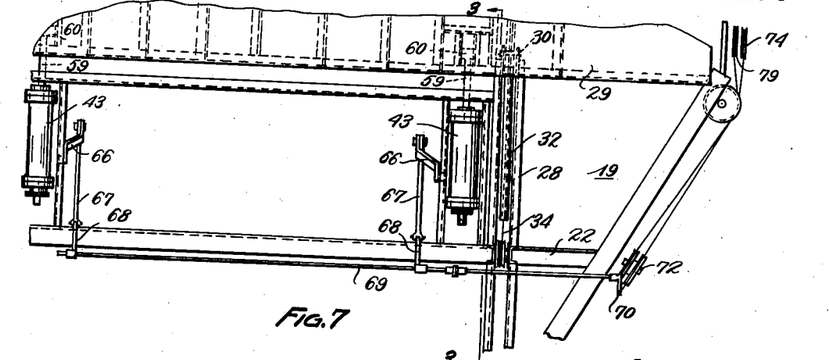
Fig. 7 is a fragmentary top plan view of a portion of the discharge pan and retarder mechanism and shows part of the control means for locking the retarder plate of the retarder mechanism in any desired position.

The cylinders 43 are provided with pistons 58 carried by piston rods 59 which extend outwardly of the cylinders and are pivotally connected, as indicated at 60, in Figs. 3 and 7, to the retarder plate 29. It will be seen that when the retarder plate 29 is in its normal or full line position of Figs. 2 and 3 the pistons 58 are adjacent the left-hand end of the cylinders 43, as viewed in Figs. 5 and 6. As the retarder plate swings toward fully opened position, i. e., from the full line position to the dash line position of Figs. 2 and 3, the pistons 58 move from the dash line position of Fig. 6 toward the full line position thereof and the fluid in the cylinders 53 in front of the pistons is forced from the right-hand ends of the cylinders, as viewed in the drawings, upwardly through the passage 46, elbows 52, pipes 51 and thence through the couplings and unions to the left-hand passages 46 and into the left-hand side or end of the cylinders.

The pistons 58 move relatively freely from left to right of the cylinders, as just referred to, inasmuch as the spring-pressed valve 57 opens to allow a relatively free passage of the fluid from the right-hand side of the cylinders to the left-hand side thereof, in addition to the fluid which is free to pass through the orifice 55 which is always open.

When the retarder plate 29 moves from fully open, the dash line position of Figs. 2 and 3, to the full line or normally closed position thereof under the action of the counterweights 38 after the dumped material has passed down the chute, the pistons 58 move in the cylinders from the right-hand end thereof toward the left-hand end. This movement forces the fluid in the left-hand end of the cylinders outwardly of the cylinders through the unions and connections previously referred to and into the right-hand end of the cylinders. However, during the movement of the pistons in the last mentioned direction there is not a free flow of the fluid from the left-hand side of the cylinders to the right-hand side thereof, since all of the fluid must pass through the orifice 55 as the spring-pressed valve 57 remains seated. Consequently the return movement of the retarder plate 29 from fully opened to closed normal position under the action of the counterweights 38 is snubbed or checked by the dashpot construction just explained and said return movement of the retarder plates is relatively slow.

The location of the left-hand passages 46 of the hydraulic cylinders and the relationship of the pistons to the cylinders and to the retarder plate are such that when the retarder plate 29 is in its normal position the pistons 58 will be located at the extreme left-hand end of the cylinders, as viewed in the drawing, that is will be located to the left of the left-hand passages 46.

It will be seen that when the starting position of the pistons 58 in their movement from left to right in the cylinder is to the left of the left-hand passages 46, such movement of the pistons would not displace the fluid from in front of the pistons to the rear thereof until the pistons had reached said passages 46 or had passed to the right thereof. Therefore said pistons would be locked against movement altogether or could only have a very slow movement with a consequent locking of the retarder plate against movement or, at best, permitting only an extremely slow movement thereof. In order to avoid this condition the interior walls of the left-hand end of the cylinders 43, as viewed in the drawings, are provided with one or more small grooves 61 extending from the left-hand end of the cylinders to the left-hand passages 46. Therefore when the pistons 58 commence their movement from their extreme left-hand position in the cylinders toward the right-hand end thereof the fluid in front of the pistons will be displaced through the grooves 61 to the rear of the pistons until the pistons have reached the left-hand passages 46. Consequently the initial rate of opening movement of the retarder plate 29 can be predetermined by having the cross-sectional area of the grooves 61 of a predetermined size. Also the grooves 61 prevent or eliminate the tendency for a vacuum to be created to the left of the pistons 58 during the initial portion of their movement from left to right in the cylinders.

Likewise, when the pistons are moving from right to left in the cylinders and have passed the left-hand passages 46 the fluid to the left of the pistons can escape through the grooves 61 to the right of the pistons and while such fluid to the left of the pistons acts as a cushion at the last part of the return movement of the retarder plate 29 to normal position, it does not act as a lock preventing the complete return of the retarder plate to normal position as would be the case were the grooves 61 not provided in the cylinder walls.

Similarly, the walls of the cylinders adjacent the right-hand ends thereof and to the right of the right-hand passages are provided with one or more longitudinally extending grooves 62 of predetermined cross-sectional area so that when the pistons 58 have reached or have passed the right-hand passages 46 as the pistons move toward the right of the cylinders, the fluid at the right of the pistons will be displaced through the grooves 62 to the left thereof. This arrangement also provides for cushioning the last portion of the opening movement of the retarder plate while allowing the retarder plate to move to fully opened position.

It will be seen that the dashpot arrangement hereinbefore explained, due to the differential in the rate at which the fluid can be displaced from one side of the cylinders to the other side thereof, allows the retarder plate 29 to move from normal or closed position toward open position relatively freely and at the desired speed although the dashpots assist the counterweights 38 in regulating the speed of the opening movement of the retarder plate. Since the displaced fluid flows relatively slowly from the left-hand side of the cylinder toward the right-hand side, due to the one-way valve 57 being closed, the movement of the retarder plate from open to fully closed or normal position is relatively slow and is accomplished without any detrimental jarring or shocks. Likewise, it will have been seen that the extreme end portions of the movements of the pistons in both directions are cushioned but not completely stopped, since the fluid can be displaced through the grooves 61 and 62.

In addition it has been pointed out that the grooves 61 regulate the speed of the initial portion of the opening movement of the retarder plate during such time as the pistons 58 are at the left of the left-hand passages 46.

It is often desirable that the flow of the dumped material down the inclined discharge pan be stopped or at least partially stopped at various times as, for example, to enable the material passing into the hold of a vessel or other receptacle to be trimmed and to enable this the retarder plate may be locked against movement in any direction in any position at the will of the operator by the following mechanism: The fitting 48 has rotatably mounted therein a valve plug 63 of well known construction, and this plug is provided with a passage 64 extending diametrically through the plug, whereby said passage by rotating the plug through an arc of 90° can be brought into or out of registration with the passages in the connections 47 and 49, it being understood that when said plug is turned to place the passage 64 out of registration with the other passages, as indicated in Figs. 5 and 6, no fluid can be displaced from one side of the cylinders 43 to the other side thereof and thus the pistons 58 are hydraulically locked against movement in either direction, and, of course, since the piston rods 59 are connected to the retarder plate 29 said plate is locked also against movement in either direction.

Extending outwardly from the plugs 63 and fixedly connected therewith are shafts 65 that have fixedly secured thereto one end of arms 66, the opposite ends of which arms are pivotally connected to one end of links 67. The opposite ends of the links 67 are pivotally connected to one end of lever arms 68, the opposite ends of which lever arms are provided with sleeve-like portions arranged on and fixed to a shaft 69 rotatably mounted in suitable supports carried by the supporting structure for the retarding mechanism.

Figure 8:
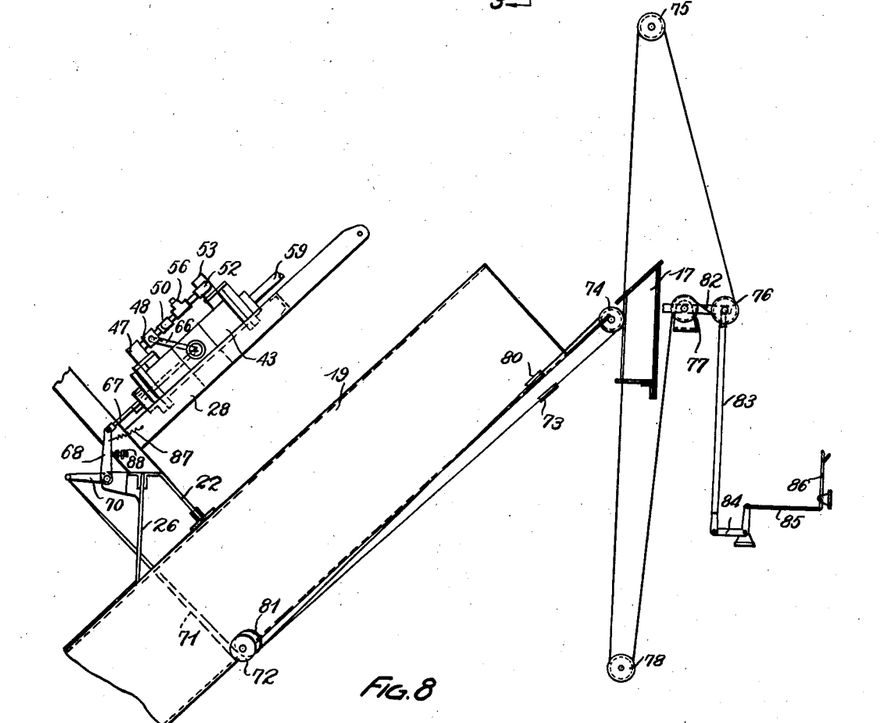
Fig. 8 is a schematic view illustrating the control means for the valve of the hydraulic dashpot which when closed prevents the flow of fluid from and to either side of the piston and acts to lock the retarder plate of the retarder mechanism in any desired position.

The shaft 69 adjacent one of its ends has fixed thereto a lever arm 70, see Figs. 7 and 8. A rope 71 has one of its ends secured to the free end of the lever arm 70 and extends therefrom around a sheave 72 suitably carried or supported by the discharge pan, and thence over sheaves 73 and 74 and upwardly about a sheave 75 mounted on the dumper frame, and thence downwardly around a movable sheave 76 and a sheave 77 rotatably mounted in fixed supports, from whence it passes downwardly about a sheave 78 and thence upwardly about a sheave 79 coaxial with the sheave 74 from which it extends around a sheave 80 adjacent the sheave 73 and thence around a sheave 81 and upwardly to the lever arm 70.

It will be understood that the sheaves 72, 81, 73, 80 and 74, 79 are suitably supported on the discharge pan or on the dumper frame, while the sheaves 75, 76, 77 and 78 likewise may be suitably supported upon the dumper frame, but inasmuch as the exact manner and location in which these sheaves are to be mounted may vary considerably and will be apparent to one skilled in the art, the location and mounting thereof have only been indicated schematically in the drawings.

As previously stated, the sheave 77 while rotatable is mounted on a fixed axis and the mounting support for the sheave 77 has pivotally connected thereto an arm 82 which carries at its outer end the supporting pin upon which the sheave 76 is rotatably mounted, wherefore it will be seen that when the arm 82 is rocked about its pivotal connection to the support for the sheave 77, the axis of the sheave 76 will travel in an arc the radius of which is the distance between the connection of the arm 82 to the sheave 76 and to the support for the sheave 77.

Likewise, it will be noted that when the sheave 76 and arm 82 are moved in a downward direction the rope 71 is pulled downwardly from the sheaves 75 and 77, with the result that there is an equalized downward pull upon the lever arm 70 by both ends of the rope 71 attached thereto. Such downward pull upon the lever arm 70 rocks the shaft 69 and through the levers 68, links 67, arms 66 and shafts 65 rotates the valve plug 63 in the direction resulting in the passage 64 moving out of alignment with its complementary passages to prevent flow of fluid from one end of the cylinder to the other end thereof.

The downward movement of the arm 82 and sheave 76 may be accomplished by means of the rod 83 that has its upper end pivotally connected to the arm 82 adjacent the sheave 76, while its lower end is pivotally connected to one arm of a bell lever 84, the other arm of which is pivotally connected to a link 85. The link 85 may have its free end pivotally connected to one end of a control lever 86 that is pivoted upon a suitable support intermediate its ends. It will be seen that the control lever 86 may be located in a convenient position for the operator as, for example, in the control cab of the car dumper, but since this will be well understood in the art it has only been schematically indicated herein.

From the foregoing it will be seen that the operator by moving the control lever in the proper direction can, through the operative connections just explained, close the valve 63 either fully or partially so that he may either lock the retarder plate against movement in either direction and in any position, or he may control the rate of such movement in addition to the regular and fixed controls therefor already explained.

In order to return the valve 63 to its normal open position a spring 87 can be connected to the arms 68 or to any other suitable part of the control mechanism, it being understood that the control lever 86 may be provided with any well known means for locking the same in the various positions to which it has been moved by the operator. The spring 87, of course, also acts to restore the sheave 76 to its normal position.

Adjustable stops 88 may be mounted on the supporting frame for the retarding mechanism to limit the movement of the arms 68 under the action of the springs 87, wherefore the valve 63 may be controlled so as to normally be fully opened or only partially opened, depending upon the conditions desired with respect to the movements of the retarder plate.

From the foregoing description it will be noted that when the cradle is turned to dump the contents of a car thereon, the material falling from the car is first received by the retarder plate and does not have a long direct fall which would result in causing a breakage of the material. The plate 18 when the cradle has turned through 90° engages the flapper plate 39 and the continued turning movement of the cradle, together with the weight of the dumped material on the retarder plate causes the latter to swing downwardly between the sides of the discharge pan 19, such downward movement of the retarder plate being resisted by the counterweights 38 and to a certain extent by the checking action of the dashpots that are operatively connected to the retarder plate. The rate of movement of the retarder plate is such that the dumped material is gently lowered into the discharge pan and then allowed to slowly flow in a controlled manner down the discharge pan until it has passed from beneath the retarder plate which has now been moved to open position. As soon as the material has passed down the discharge pan the counterweights 38 return the retarder plate to its normal or closed position, it being recalled that such return movement of the retarder plate is checked or snubbed by the dashpot arrangement previously described.

The retarder mechanism of the present invention eliminates entirely or reduces to a substantial degree breakage in the material being dumped and thus renders the car dumper equipped with such mechanism more efficient and economical in operation.

Although a preferred embodiment of the invention has been illustrated and described herein, it will be understood that the invention is susceptible of various modifications and adaptations within the scope of the appended claims.

Having thus described our invention we claim:

1. In combination with the discharge pan of a car dumper, a retarder mechanism positioned adjacent the dumping point for the cradle of the dumper so as to receive initially the load being discharged onto the pan and comprising a support carried by said discharge pan, a movable retarder plate mounted on said support and normally located across the upper end of the discharge pan and a substantial distance above the floor of said pan, means for maintaining said retarder plate in its normal position and for resisting movement thereof during the dumping operation from normal position to open position, and means operatively associated with said retarder plate for regulating automatically the rate of movement of said plate from open position to normal position under the action of said first named means.

2. In combination with the discharge pan of a car dumper, a retarder mechanism positioned adjacent the dumping point for the cradle of the dumper so as to receive initially the load being discharged onto the pan and comprising a retarder plate pivotally associated with said discharge pan and in raised position extending across the upper end of said pan a substantial distance above the floor thereof but adapted to swing downwardly of said pan within the side walls thereof to open position, means acting on said retarder plate to normally hold the same in said raised or elevated position and for resisting downward swinging movement thereof to open position, and means operatively associated with said retarder plate for controlling automatically the rate of movement of said plate from its lowered or open position to its raised or normally closed position under the action of said first named means.

3. In combination with a car dumper having a tiltable cradle and a discharge pan, a retarding mechanism adjacent the dumping point of said cradle so as to receive initially the load being discharged therefrom onto the pan and comprising a retarder plate pivotally associated with said discharge pan and extending across the upper end of said pan so as to be capable of swinging downwardly within the side walls of the pan, means associated with said retarder plate and acting to maintain the same normally in raised position a substantial distance above the floor of the pan and to resist downward swinging movement thereof, and hydraulic means operatively associated with said retarder plate for resisting swinging movement of said plate under the action of the first mentioned means from a downwardly swung position to its normal or raised position.

4. In combination with the discharge pan of a car dumper, a retarder mechanism positioned adjacent the dumping point of the cradle of said car dumper so as to receive initially the load being discharged onto the pan comprising a movable retarder plate operatively associated with said discharge pan and normally located across the upper end of the pan a substantial distance above the floor of the latter but capable of movement within the side walls of the pan, means for maintaining said retarder plate in its normal position and for resisting movement thereof during the dumping operation from normal position to a position within the side walls of said pan, and hydraulic means operatively associated with said retarder plate for regulating the rate of the return movement of said plate from said last named position to normal position under the action of said first named means.

5. In combination with the discharge pan of a car dumper, a retarder mechanism positioned adjacent the dumping point of the cradle of said car dumper so as to receive initially the load being discharged onto the pan comprising a movable retarder plate operatively associated with said pan and normally located across the upper end of the pan a substantial distance above the floor of the latter but capable of movement within the side walls thereof, means for maintaining said retarder plate in its normal position and for resisting movement thereof during the dumping operation from normal position to a position within the side walls of the pan, and means operatively associated with said retarder plate for regulating the rate of return movement of said plate from said last named position to normal position under the action of said first named means and including a fluid containing cylinder, a piston operable therein, and valve means allowing said piston relatively free movement in one direction and a relatively retarded movement in the opposite direction.

6. In combination with the discharge pan of a car dumper, a retarder mechanism positioned adjacent the dumping point of the cradle of said car dumper so as to receive initially the load being discharged onto the pan comprising a retarder plate pivotally associated with said pan and normally extending across the upper end thereof a substantial distance above the floor of the pan but capable of swinging downwardly between the side walls of the pan, means for maintaining said retarder plate in its normal position and for resisting during dumping operation the downward swinging movement thereof between the side walls of the pan, and means operatively associated with said retarder plate for regulating the rate of the return movement of said plate from a downwardly swung position to normal position under the action of said first named means and including a fluid containing cylinder, a piston operable therein, and valve means associated with said cylinder and allowing relatively free movement of said piston in one direction and a relatively retarded movement thereof in the opposite direction.

7. In combination with the discharge pan of a car dumper, a retarder mechanism comprising a movable retarder plate operatively associated with said pan and normally located in a substantially horizontal position across the upper end of the pan but capable of movement between the side walls of the pan, means for maintaining said retarder plate in its normal horizontal position and for resisting movement thereof during the dumping operation between the side walls of the pan, a flapper plate associated with the edge of the retarder plate that is adjacent to the car dumper and extending throughout the length of the retarder plate, and means movably connecting said flapper plate to said retarder plate such that said flapper plate normally lies in the plane of the retarder plate but can move in one direction only into a position angularly disposed to such plane.

8. In combination with the discharge pan of a car dumper, a retarder mechanism comprising a retarder plate pivotally associated with said pan and normally located in a substantially horizontal position across the upper end of the pan but capable of downward swinging movement between the side walls of the pan, means for maintaining said retarder plate in its normally substantially horizontal position and for resisting downward swinging movement between the side walls of the pan during the dumping operation, a flapper plate associated with the longitudinal free edge of the retarder plate adjacent to the car dumper and extending throughout the length of the retarder plate, and means pivotally connecting said flapper plate to said retarder plate such that said flapper plate normally lies in the plane of the retarder plate but can move in one direction only into a position angularly disposed to such plane.

9. In combination with the discharge pan of a car dumper, a retarder mechanism positioned adjacent the dumping point of the cradle of said car dumper so as to receive initially the load being discharged onto the pan and a supporting structure carried by said discharge pan, said retarder mechanism comprising a retarder plate extending substantially the width of such pan and pivotally connected to said supporting structure and movable from a substantially horizontal position above the upper end and floor of the pan downwardly to an inclined position intermediate the side walls of the pan, means operatively associated with said retarder plate for normally maintaining the same in said first named position and for resisting downward movement thereof to an inclined position between the side walls of the pan, and means operatively associated with said retarder plate for controlling automatically the rate of the return movement of said plate from said inclined position to said normal position.

10. In combination with a car dumper of the type having a tiltable car receiving cradle and a discharge pan, a retarder mechanism carried by said discharge pan and comprising a pivoted retarder plate normally extending substantially the width of the discharge pan above the upper end thereof and projecting toward the frame of the car dumper, means acting on said retarder plate to hold the same in normal position, said cradle being provided with means extending the length thereof and which during the tilting of the cradle thereof and to dump the contents of a car thereon engages with the edge of said retarder plate to move the latter downwardly about its pivot.

11. In combination with the discharge pan of a car dumper, a retarder mechanism positioned adjacent the dumping point of the cradle of said car dumper so as to receive initially the load being discharged onto the pan comprising a movable retarder plate associated with said pan and normally positioned across the upper end of the discharge pan and a substantial distance above the floor of the latter but movable between the side walls thereof, means for maintaining said retarder plate in its normal position and for resisting movement thereof during the dumping operation from normal position to a position between the side walls of the pan, means operatively associated with said retarder plate for regulating the rate of movement of said plate from said last named position to normal position under the action of said first named means, and means for locking said retarder plate against movement in any position.

12. In combination with the discharge pan of a car dumper, a retarder mechanism positioned adjacent the dumping point of the cradle of said car dumper so as to receive initially the load being discharged onto the pan comprising a retarder plate pivotally associated with said discharge pan and in raised or closed position extending across the upper end of said pan a substantial distance above the floor of the latter but adapted to swing downwardly of said pan within the side walls thereof to open position, means acting on said retarder plate to normally hold the same in said raised or closed position and for resisting downward swinging movement thereof to open position, means operatively associated with said retarder plate for controlling the rate of movement of said plate from its lowered or open position to its raised or normally closed position under the action of said first named means, and means for locking said retarder plate against swinging movement in any position.

13. In combination with the discharge pan of a car dumper, a retarder mechanism positioned adjacent the dumping point of the cradle of said car dumper so as to receive initially the load being discharged onto the pan comprising a retarder plate pivotally associated with said discharge pan and in raised or closed position extending across the upper end of said pan a substantial distance above the floor of the latter but adapted to swing downwardly of said pan within the side walls thereof to open position, means acting on said retarder plate to normally hold the same in said raised or closed position and for resisting downward swinging movement thereof to open position, means operatively associated with said retarder plate for controlling the rate of movement of said plate from its lowered or open position to its raised or normally closed position under the action of said first named means, means for locking said retarder plate against pivotal movement in any position, and means for controlling said last named means from a point remote to said retarder mechanism.

14. In combination with the discharge pan of a car dumper, a retarder mechanism positioned adjacent the dumping point of the cradle of said car dumper so as to receive initially the load being discharged onto the pan comprising a movable retarder plate operatively associated with said pan and normally located across the upper end of the pan a substantial distance above the floor of the latter but capable of movement within the side walls thereof, means for maintaining said retarder plate in its normal position and for resisting movement thereof during the dumping operation from normal position to a position within the side walls of the pan, means operatively associated with said retarder plate for regulating the rate of return movement of said plate from said last named position to normal position under the action of said first named means and including a fluid containing cylinder, a piston operable therein, valve means allowing said piston relatively free movement in one direction and a relative retarded movement in the opposite direction, and a second valve means associated with said cylinder and movable to a closed position wherein said piston is held against movement in either direction and said retarder plate is locked in any position.

15. In combination with a car dumper having a tiltable cradle and a discharge pan, a retarder mechanism positioned adjacent the dumping point of said tiltable cradle so as to receive initially the load being discharged onto the pan comprising a movable retarder plate operatively associated with said pan and extending across the upper end thereof but capable of moving between the side walls of the pan, means associated with said plate and acting to maintain the same normally in position across the upper end of the pan a substantial distance above the floor of the latter and to resist movement thereof between the side walls of the pan, and hydraulic means operatively associated with said retarder plate for resisting movement of said plate under the action of said first named means from said last named position to said first named position, said hydraulic means also controlling the rate of movement of the retarder plate from its first named position toward the second named position thereof during the initial portion of said movement.

16. In combination with a car dumper having a tiltable cradle and a discharge pan, a retarder mechanism positioned adjacent the dumping point of said tiltable cradle so as to receive initially the load being discharged onto the pan comprising a retarder plate pivotally associated with said discharge pan and extending substantially horizontally across the upper end of said pan but capable of swinging downwardly within the side walls thereof, means associated with said retarder plate and acting to maintain the same normally in raised position and to resist downward swinging movement thereof, and independent means operatively associated with said retarder plate for controlling automatically the rate of movement of the same during the initial portion of its downward swinging movement.

17. In combination with a car dumper having a tiltable cradle and a discharge pan, a retarding mechanism positioned adjacent the dumping point of said tiltable cradle so as to receive initially the load being discharged onto the pan comprising a movable retarder plate operatively associated with said discharge pan and normally extending across the upper end of the pan but capable of movement downwardly within the side walls thereof, means associated with said retarder plate and acting to maintain the same in its normal position and to resist downward movement thereof, and means operatively associated with said retarder plate for cushioning the end portions of its movements in opposite directions.

18. In combination with a car dumper having a tiltable cradle and a discharge pan, a retarding mechanism positioned adjacent the dumping point of said tiltable cradle so as to receive initially the load being discharged onto the pan comprising a retarder plate pivotally associated with said discharge pan and extending substantially horizontally across the upper end of said pan but capable of swinging downwardly within the side walls of the same, means associated with said retarder plate and acting to maintain the same normally in said substantially horizontal position and to resist downward swinging movement thereof, and hydraulic means operatively associated with said retarder plate and cushioning the movements in opposite directions thereof during the extreme end portions of such movements.

19. In a car dumper of the type having a pan girder, a tiltable cradle, and a discharge pan having its upper end connected with said girder; a retarder plate positioned adjacent the dumping point of said tiltable cradle so as to receive initially the load being discharged therefrom onto the pan and extending transversely of said pan, means operatively associating said plate with the upper end of said pan to move from a position wherein the material engaging surface of the plate is located entirely at a higher elevation than the top of said girder to a position wherein it extends to a point located at a lower elevation than the top of said girder, and means for normally maintaining said plate in said first named position and resisting its movement from said position to said second named position but such as to be overcome gradually by the pressure of the dumped material against the said surface of the retarder plate.

20. In a car dumper of the type having a pan girder, a tiltable cradle, and a discharge pan having its upper end connected with said girder; a pivoted retarder plate operatively associated with the upper end of said pan and extending transversely thereof and normally located in a substantially horizontal plane and at a higher elevation than the top of said girder, and means maintaining said plate in its normal position and resisting pivotal movement thereof from said position.

21. In a car dumper of the type having a pan girder, a tiltable cradle, and a discharge pan having its upper end connected with said girder; a supporting structure carried by said pan above the same, a retarder plate pivotally connected to said structure at a point above the upper edge of the side walls of said pan and adjacent to the upper end of the latter, said retarder plate extending transversely of said pan, and means operatively associated with said plate for maintaining the same in a substantially horizontal position above the side walls and the upper end of said pan and providing for a restrained swinging movement of said plate under predetermined loads angularly downwardly between the side walls of said pan.

GUY W. BLANOT.
JOHN ANDREWS.